United States Patent
Nau et al.

(10) Patent No.: US 11,976,150 B2
(45) Date of Patent: May 7, 2024

(54) HYDROCARBON RESIN AND PROCESS FOR PRODUCTION THEREOF

(71) Applicant: Rain Carbon Germany GmbH, Castrop-Rauxel (DE)

(72) Inventors: Manuel Nau, Haltern am See (DE); Björn Dreisewerd, Dortmund (DE); Jun Liu, Duesseldorf (DE); Edgar Fuhrmann, Castrop-Rauxel (DE); Matthias Heitmann, Duesseldorf (DE)

(73) Assignee: Rain Carbon Germany GmbH, Castrop-Rauxel (DE)

( * ) Notice: Subject to any disclaimer, the term of this patent is extended or adjusted under 35 U.S.C. 154(b) by 0 days.

(21) Appl. No.: 17/798,918

(22) PCT Filed: Feb. 12, 2021

(86) PCT No.: PCT/EP2021/053527
§ 371 (c)(1),
(2) Date: Aug. 11, 2022

(87) PCT Pub. No.: WO2021/160844
PCT Pub. Date: Aug. 19, 2021

(65) Prior Publication Data
US 2023/0071991 A1 Mar. 9, 2023

(30) Foreign Application Priority Data
Feb. 13, 2020 (EP) .................. 20157171

(51) Int. Cl.
*C08F 232/08* (2006.01)
*C08L 47/00* (2006.01)

(52) U.S. Cl.
CPC ........... *C08F 232/08* (2013.01); *C08L 47/00* (2013.01)

(58) Field of Classification Search
CPC .... C08F 232/08; C08F 212/08; C08F 244/00; C08F 8/04; C08F 2/01; C08F 232/06; C08F 212/06; C08F 2/06; C08J 11/08; C08J 125/08; C08J 145/00; C08J 132/02; C08J 123/08
See application file for complete search history.

(56) References Cited

U.S. PATENT DOCUMENTS 5,171,793 A * 12/1992 Johnson ................. C09J 153/00
525/332.8

FOREIGN PATENT DOCUMENTS

| DE | 262028 A1 | 11/1988 |
| EP | 0936229 B1 | 4/2004 |
| EP | 3875528 A1 | 9/2021 |
| JP | H05194629 A | 8/1993 |
| WO | 2019158638 A1 | 8/2019 |
| WO | 2020090665 A1 | 5/2020 |

OTHER PUBLICATIONS

Shashok, et al. "Tack Promoters Based on Petroleum Polymer Resins in Rubber Mixtures", Belarusian State Technological University, (2019), pp. 1-41, vol. 2, No. 2.
Sutyagin, "Bondaletova L.I. Chemistry and physics of polymers", Textbook, Tomsk, TPU Publishing House (2003), pp. 132-173.

* cited by examiner

*Primary Examiner* — Robert D Harlan
(74) *Attorney, Agent, or Firm* — The Webb Law Firm

(57) ABSTRACT

Presented and described is a hydrocarbon resin obtainable by thermal polymerization of a cyclic diolefin component including a cyclic diolefin compound with an aromatic component including indene and/or $C_{1-4}$-alkylindene, with the hydrocarbon resin having a polydispersity index (PDI) of 1 to less than 2.3. Further described is a production process for the hydrocarbon resin, wherein a monomer mixture which includes an aromatic component including indene and/or $C_{1-4}$-alkylindene and a cyclic diolefin component including a cyclic diolefin compound is polymerized by heating to a polymerization temperature of at least 180° C. to give a product stream including hydrocarbon resin, and oligomers which include units originating from the cyclic diolefin compound and/or units originating from the aromatic component are separated from the product stream and returned to the monomer mixture. Lastly described are a hydrogenated hydrocarbon resin, a process for production thereof, and the use of the hydrocarbon resin and of the hydrogenated hydrocarbon resin.

20 Claims, 1 Drawing Sheet

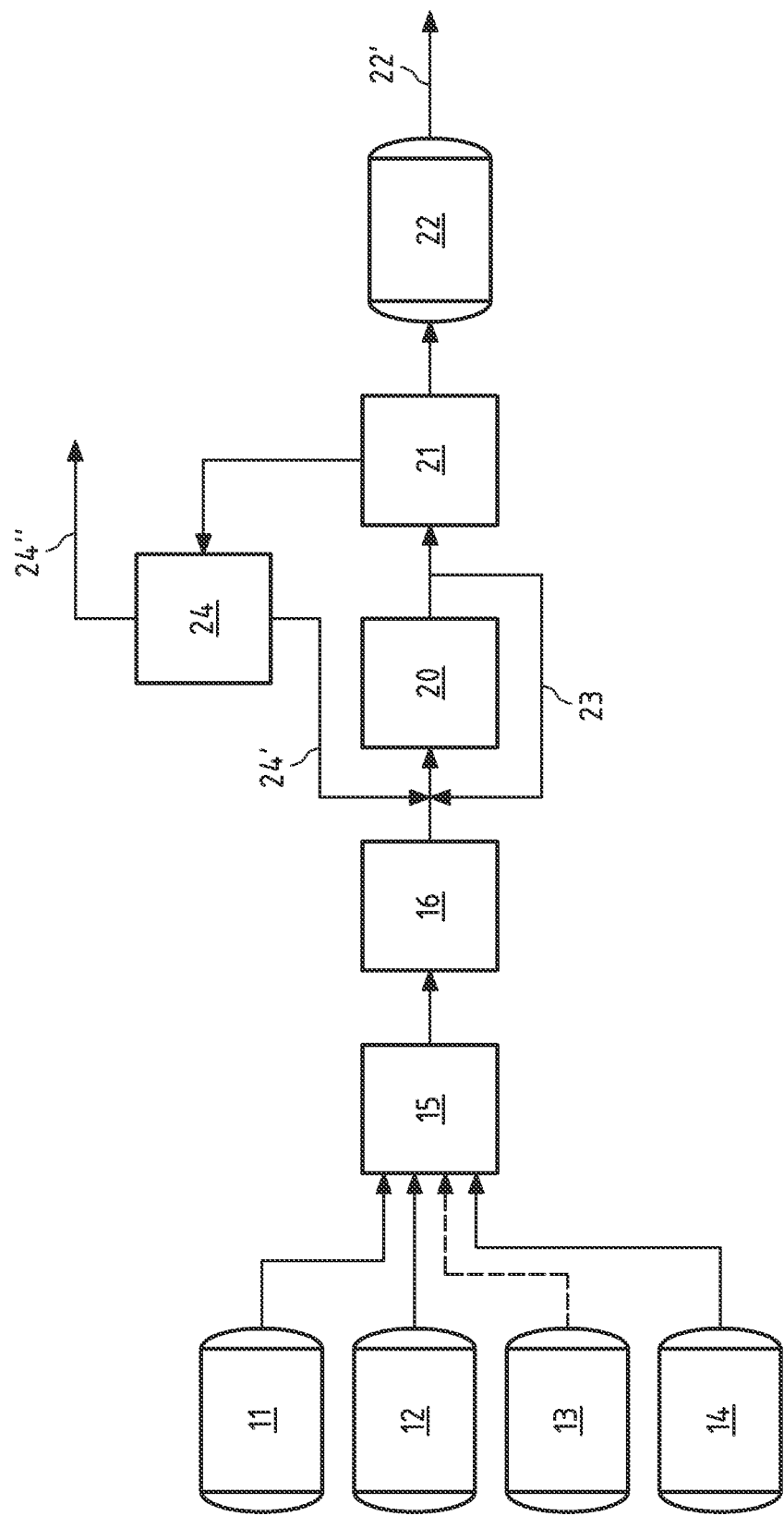

HYDROCARBON RESIN AND PROCESS FOR PRODUCTION THEREOF

CROSS-REFERENCE TO RELATED APPLICATIONS

This application is the United States national phase of International Application No. PCT/EP2021/053527 filed Feb. 12, 2021, and claims priority to European Patent Application No. 20157171.8 filed Feb. 13, 2020, the disclosures of which are hereby incorporated by reference in their entirety.

BACKGROUND OF THE INVENTION

Field of the Invention

The invention relates to a hydrocarbon resin, to a method for its production from a cyclic diolefin component comprising a cyclic diolefin compound and an aromatic component comprising indene and/or $C_{1-4}$-alkylindene, to its hydrogenation, and to a hydrogenated hydrocarbon resin.

Description of Related Art

Hydrocarbon resins are frequently used as tackifying agents in hot-melt adhesives. Tackifying agents are typically also referred to as tackifiers. Hot-melt adhesives have a base polymer that essentially determines the properties of the hot-melt adhesive. Metallocene polyolefins (mPO), amorphous polyalphaolefins (APAO), or ethylene-vinyl acetate copolymers (EVAC) are often used as base polymers in hot-melt adhesives, in addition to styrene block copolymers (SBC), polyamide, polyurethane and polyester.

The brightest possible hot-melt adhesives with good processing properties are of particular interest. Defined compatibility of tackifier and base polymer is essential for good processing properties of the hot-melt adhesive. The tackifiers used normally only have good compatibility with one base polymer class such as mPO, APAO or EVAC, so that a separate tackifier is required for each base polymer class if good compatibility is desired. However, it would be advantageous if the tackifier were compatible with as many base polymer classes as possible. The compatibility of the components of the hot-melt adhesive can be assessed, for example, by determining the cloud point.

In order to produce hot-melt adhesives that are as bright as possible and that are easy to process, it is important that the at least partially hydrogenated hydrocarbon resins used for this purpose are as free as possible of undesired by-products. These can lead to dark discoloration in the hydrocarbon resin and incompatibilities with other constituents of a hot-melt adhesive. The Gardner color number, Yellowness Index or Hazen color number are often used to assess discoloration.

Methods for producing (hydrogenated) hydrocarbon resins are known. For example, in these methods a cycloalkene having two conjugated double bonds such as cyclopentadiene and an ethylenically unsaturated aromatic component such as styrene is copolymerized, and the hydrocarbon resin obtained is at least partially hydrogenated in a further step. The hydrocarbon resin obtained in this way can be used alone or together with other additives as a tackifier for hot-melt adhesives.

Such a method is described in U.S. Pat. No. 5,502,140 A, in which particularly inexpensive dicyclopentadiene-containing starting materials are used. However, U.S. Pat. No. 5,502,140 A does not use indene but rather vinyl aromatics, such as styrene or α-methylstyrene, in the reaction.

EP 2 251 364 B1 describes a method for producing hydrocarbon resins of the type described at the outset, which have a content of aromatic compounds of 5 to 25 wt. %. Also in EP 2 251 364 B1, qualitatively high-grade resins are achieved only by using a pure vinyl aromatic such as styrene as the ethylenically unsaturated aromatic component.

EP 0 936 229 B1 describes a method for producing an aromatically modified aliphatic hydrocarbon resin, in which polymerization feeds comprising olefins, aromatic monomers, and (di)cyclodiolefins are subjected to Friedel-Crafts polymerization. However, the disadvantage of the method of EP 0 936 229 B1 is the use of halogen-containing catalysts for the production of hydrocarbon resins.

In the production of hydrocarbon resins, by-products can be formed at different points for different reasons. For example, in addition to the desired hydrocarbon resin, low-molecular-weight waxy or high-molecular-weight thermoset-like by-products can also form during polymerization, which impair the quality of the final product and can contribute to incompatibility in the hot-melt adhesive.

Detrimental by-products can also be formed during the purification and/or the isolation of intermediate products or during the isolation of the final product. For example, both the polymerization and the hydrogenation are normally performed in the presence of various inert solvents so that, both after the polymerization and after the hydrogenation, in some instances considerable amounts of solvent need to be removed. The removal of the often high-boiling solvents usually requires heating to high temperatures, which can result in by-products due to secondary reactions.

Various solutions have been proposed to avoid by-products. For example, EP 3 124 503 A1 describes a method for producing hydrocarbon resins, in which method, in order to improve compatibility with an acceptable increase in costs, dicyclopentadiene is reacted with a vinyl aromatic compound to form a phenylnorbornene derivative, which acts as a starter in the subsequent polymerization reaction. The hydrocarbon resin thus obtained is then hydrogenated. The disadvantage of this method is that the preliminary reaction contains an additional step in which the temperature must also be kept within a narrow window in order to obtain the phenylnorbornene derivative with high selectivity.

SUMMARY OF THE INVENTION

The invention is consequently based on the object of providing hydrocarbon resins that are as bright as possible. A further object of the invention is to provide hydrocarbons that have good compatibility with base polymers, in particular with metallocene polyolefins (mPO), amorphous polyalphaolefins (APAO), and/or ethylene-vinyl acetate copolymers (EVAC), thereby in particular with metallocene polyolefins (mPO), amorphous polyalphaolefins (APAO), and ethylene-vinyl acetate copolymers (EVAC), of hot-melt adhesives, and thus serve as tackifiers. Furthermore, the invention has the object of providing a method with which hydrocarbon resins having the aforementioned compatibility can be produced.

This object is achieved by a hydrocarbon resin obtainable by thermal polymerization of a cyclic diolefin component, comprising a cyclic diolefin compound with an aromatic component comprising indene and/or $C_{1-4}$ alkylindene, wherein the hydrocarbon resin has a polydispersity index (PDI) of 1 to less than 2.3.

The subject matter of the invention is furthermore a method for producing the hydrocarbon resin according to the invention, in which method a monomer mixture which contains an aromatic component containing indene and/or $C_{1-4}$-alkylindene and a cyclic diolefin component containing a cyclic diolefin compound is polymerized by heating to a polymerization temperature of at least 180° C. to obtain a product stream containing hydrocarbon resin, wherein oligomers which contain units originating from the cyclic diolefin compound and/or units originating from the aromatic component are separated from the product stream and returned to the monomer mixture.

The subject matter of the invention is also a hydrogenated hydrocarbon resin obtainable by hydrogenating the hydrocarbon resin according to the invention and/or by the production method according to the invention.

The subject matter of the invention is also a composition comprising
- a hydrocarbon resin according to the invention or a hydrogenated hydrocarbon resin according to the invention, and
- an adhesive base polymer, for example a metallocene polyolefin or an ethylene-vinyl acetate copolymer or an amorphous polyalphaolefin or a styrene block copolymer.

The subject matter of the invention is also the use of a hydrocarbon resin according to the invention or of a hydrogenated hydrocarbon resin according to the invention as a tackifying agent or tackifier in hot-melt adhesives, in particular in hot-melt adhesives based on metallocene polyolefin, ethylene-vinyl acetate copolymer, amorphous polyalphaolefins, or styrene block copolymers, and/or in solvent-containing adhesives, in particular in solvent-containing styrene block copolymer adhesives.

The subject matter of the invention is furthermore the use of a hydrocarbon resin according to the invention as a modifier in rubber products, in particular to improve the mechanical and dynamic properties in rubber products, in bitumen, in particular as an additive and/or as a hydrophobizing agent in bitumen, in particular for asphalt, or as a modifier and/or hydrophobizing agentin printing inks.

Finally, the subject matter of the invention is the use of a hydrogenated hydrocarbon resin according to the invention as an additive in paint; in plastics material, in particular as a modifier in plastics material; in rubber; in bitumen, in particular as a hydrophobizing agentin bitumen, for example for roofing felt; in polypropylene films, in particular as a modifier and/or hydrophobizing agent in polypropylene films, in particular BOPP films; in cosmetics; or as tackifiers in adhesive compositions, in particular for applications in the hygiene product industry and for use in food packaging.

Surprisingly, it has been found that a hydrocarbon resin with a PDI of 1 to less than 2.3, which is obtained by thermal polymerization of a cyclic diolefin component with a component containing indene and/or $C_{1-4}$-alkylindene, has excellent properties, in particular good hydrogenation ability and/or only slight discoloration. Furthermore, by hydrogenating this resin, a hydrogenated resin can be obtained which has very low color indices and good compatibilities with mPO and APAO, or preferably even with mPO, APAO, and EVAC.

BRIEF DESCRIPTION OF THE DRAWING

FIG. 1 shows a schematic view of the method according to the invention.

DESCRIPTION OF THE INVENTION

The method according to the invention for producing hydrocarbon resins and possible subsequent hydrogenation are first described below.

In the method according to the invention, the monomer mixture is preferably substantially single-phase liquid while heating to a polymerization temperature of at least 180° C. and during the polymerization. This results in good mixing, a shorter reaction time, and good heat transfer within the mixture.

The cyclic diolefin component contains a cyclic diolefin compound. The cyclic diolefin component preferably contains 25 wt. % or more, 30 wt. % or more, preferably 35 wt. % or more, more preferably 50 wt. % or more, even more preferably 60 wt. % or more, yet more preferably 70 wt. % or more, based on the total mass of the cyclic diolefin component of the cyclic diolefin compound.

The cyclic diolefin component can also consist of the cyclic diolefin compound.

The cyclic diolefin compound preferably contains a cycloalkene having at least two carbon-carbon double bonds, which in particular can be conjugated. More preferably, the cyclic diolefin compound consists of one or more cycloalkenes having at least two carbon-carbon double bonds, which in particular can be conjugated.

A cycloalkene having at least two carbon-carbon double bonds is referred to according to the invention as a cyclodialkene. A cyclodialkene in which the two carbon-carbon double bonds are conjugated is referred to according to the invention as a conjugated cyclodialkene.

Cyclodialkenes, in particular conjugated cyclodialkenes, preferably have 5 to 11, in particular 5 to 7, carbon atoms as a monomer. Examples of conjugated cyclodialkenes are cyclopentadiene, cyclopentadiene derivatives such as methylcyclopentadiene, ethylcyclopentadiene, pentamethylcyclopentadiene, and ethyltetramethylcyclopentadiene.

Cyclodialkenes, in particular conjugated cyclodialkenes, can dimerize. Cyclodialkenes, in particular conjugated cyclodialkenes, can be present as a monomer, as a dimer, or as a mixture of monomer and dimer. The dimerization is preferably reversible. For example, cyclopentadiene and cyclopentadiene derivatives tend to dimerize spontaneously at room temperature, wherein the monomers are formed again in the reverse reaction when heated. Monomers, dimers and/or codimers can be present if the cyclic diolefin compound contains a mixture of different cyclodialkenes, in particular conjugated cyclodialkenes.

The aforementioned examples of conjugated cyclodialkenes can accordingly be present as monomers, as dimers, or as a mixture of monomers and dimers, depending on the temperature. In addition to monomers and dimers, codimers can also be present in mixtures of different conjugated cyclodialkenes. For example, the two monomers, cyclopentadiene-cyclopentadiene dimers, methylcyclopentadiene-methylcyclopentadiene dimers, and cyclopentadiene-methylcyclopentadiene codimers can be present in mixtures of cyclopentadiene and methylcyclopentadiene.

According to one embodiment, the cyclic diolefin compound is selected from the group consisting of cyclopentadiene, cyclopentadiene derivatives such as methylcyclopentadiene, ethylcyclopentadiene, pentamethylcyclopentadiene, ethyltetramethylcyclopentadiene, and mixtures thereof.

According to a further embodiment, the cyclic diolefin compound contains cyclopentadiene and methylcyclopentadiene.

According to a further embodiment, the cyclic diolefin component consists of the cyclic diolefin compound, and the cyclic diolefin compound is selected from the group consisting of cyclopentadiene, cyclopentadiene derivatives such as methylcyclopentadiene, ethylcyclopentadiene, pentamethylcyclopentadiene, ethyltetramethylcyclopentadiene, and mixtures thereof.

According to a further embodiment, the cyclic diolefin component consists of the cyclic diolefin compound, and the cyclic diolefin compound consists of a conjugated cyclodialkene selected from the group consisting of cyclopentadiene, methylcyclopentadiene, ethylcyclopentadiene, pentamethylcyclopentadiene, and ethyltetramethylcyclopentadiene.

According to one embodiment, a hydrocarbon mixture, for example a petroleum fraction, with a content of conjugated cyclodialkenes as the cyclic diolefin compound of at least 25 wt. %, in particular of 30 to 60 wt. %, based on the mass of the hydrocarbon mixture, is used in the method according to the invention as the cyclic diolefin component. The hydrocarbon mixture can also contain aromatic compounds, for example indene, $C_{1-4}$-alkylindene, and/or ethylenically unsaturated aromatic compounds respectively having, independently of one another, 8 to 15, preferably 8 to 13, carbon atoms, preferably in an amount of 10 to 20 wt. %, based on the mass of the hydrocarbon mixture. The hydrocarbon mixture can also contain 20 to 40 wt. % non-reactive components, based on the mass of the hydrocarbon mixture.

The monomer mixture also contains an aromatic component containing indene and/or $C_{1-4}$-alkylindene. $C_{1-4}$-alkylindene means preferably mono- or poly-, in particular mono- or di-, $C_{1-4}$-alkyl-substituted indene. Examples of $C_{1-4}$-alkylindene are methylindene, dimethylindene, and ethylindene. An important example of $C_{1-4}$-alkylindene is methylindene. Methylindene includes all isomers of methylindene. Examples of isomers of methylindene are 1-methylindene and 3-methylindene. Different methylindene isomers can also be present in the aromatic component at the same time.

The aromatic component can consist of indene and/or $C_{1-4}$-alkylindene. The aromatic component can also be an aromatic mixture which contains indene and/or $C_{1-4}$-alkylindene and at least one, in particular at least two, ethylenically unsaturated aromatic compounds respectively having, independently of one another, 8 to 15, preferably 8 to 13, carbon atoms.

According to a preferred embodiment, a petroleum fraction or a constituent from tar processing containing at least 25 wt. % of indene and/or $C_{1-4}$-alkylindene and various ethylenically unsaturated aromatic compounds, based on the total mass of the petroleum fraction or on the total mass of the fraction from tar processing, are used as aromatic components.

In particular, mono- or poly-$C_1$-$C_4$-alkyl-substituted benzene compounds having a carbon-carbon double bond outside the aromatic ring are suitable as ethylenically unsaturated aromatic compounds having 8 to 15, preferably 8 to 13, carbon atoms. Examples of such ethylenically unsaturated aromatic compounds are styrene, α-methylstyrene, o-vinyltoluene, m-vinyltoluene, and/or p-vinyltoluene. The ethylenically unsaturated aromatic compounds are often referred to as vinyl aromatics.

According to one embodiment, the aromatic mixture contains indene and/or methylindene and at least two vinyl aromatics selected from the group consisting of styrene, α-methylstyrene, o-vinyltoluene, m-vinyltoluene, and p-vinyltoluene, or consists thereof.

According to one embodiment, a mixture containing 50 wt. % or less vinyl aromatics such as styrene, α-methylstyrene, o-vinyltoluene, m-vinyltoluene, and p-vinyltoluene, 30 wt. % or less indene, and 15 wt. % or less $C_{1-4}$-alkylindene, based on the total mass of the mixture, is used as an aromatic mixture.

According to a further embodiment, a mixture containing 60 wt. % or less indene and/or $C_{1-4}$-alkylindene, based on the total mass of the mixture, is used as the aromatic mixture.

The cyclic diolefin compound and indene and/or $C_{1-4}$-alkylindene or the aromatic mixture are preferably the monomers of the monomer mixture or provide said monomers.

The cyclic diolefin component and the aromatic component can be present in the monomer mixture in different ratios. However, it has been found that better results are obtained if the ratios of the cyclic diolefin component and the aromatic component are set such that the cyclic diolefin compound and indene and/or $C_{1-4}$-alkylindene and the ethylenically unsaturated aromatic compounds are present in particular ratios.

Advantageously, the cyclic diolefin compound and the aromatic component are as defined above, and the monomer mixture contains 50 to 95 wt. %, preferably 60 to 95 wt. %, or 65 to 90 wt. % or 65 to 85 wt. % or 65 to 80 wt. % of the cyclic diolefin compound, based on the total mass of cyclic diolefin compounds, indene and/or $C_{1-4}$-alkylindene, and ethylenically unsaturated aromatic compounds.

According to a preferred embodiment, the cyclic diolefin compound is selected from the group consisting of cyclopentadiene, cyclopentadiene derivatives such as methylcyclopentadiene, ethylcyclopentadiene, pentamethylcyclopentadiene, ethyltetramethylcyclopentadiene, and mixtures thereof, and the aromatic component is an aromatic mixture, the indene and/or $C_{1-4}$-alkyl, and at least one, in particular at least two, ethylenically unsaturated aromatic compounds respectively having, independently of one another, 8 to 15, preferably 8 to 13, carbon atoms, and the monomer mixture contains 50 to 95 wt. %, preferably 60 to 95 wt. %, or 65 to 90 wt. % or 65 to 85 wt. % or 65 to 80 wt. % of the cyclic diolefin compound, based on the total mass of the cyclic diolefin compound, indene and/or $C_{1-4}$-alkylindene, and ethylenically unsaturated aromatic compounds.

According to a further preferred embodiment, the cyclic diolefin compound is selected from the group consisting of cyclopentadiene, cyclopentadiene derivatives such as methylcyclopentadiene, ethylcyclopentadiene, pentamethylcyclopentadiene, ethyltetramethylcyclopentadiene, and mixtures thereof; and the aromatic component is an aromatic mixture, wherein the aromatic mixture is a mixture containing 50 wt. % or less vinyl aromatics such as styrene, α-methylstyrene, o-vinyltoluene, m-vinyltoluene, and p-vinyltoluene, 25 wt. % or less indene, and 10 wt. % or less $C_{1-4}$-alkylindene, based on the total mass of the mixture, or a mixture containing 60 wt. % or less indene and/or $C_{1-4}$-alkylindene, based on the total mass of the mixture; and the monomer mixture contains 50 to 95 wt. %, preferably 60 to 95 wt. %, or 65 up to 90 wt. % or 65 to 85 wt. %, or 65 to 80 wt. % of the cyclic diolefin compound, based on the total mass of the cyclic diolefin compound, indene and/or $C_{1-4}$-alkylindene, and ethylenically unsaturated aromatic compounds.

The cyclic diolefin compound and the aromatic component are advantageously as defined above, and the monomer mixture contains 5 to 40 wt. %, preferably 10 to 35 wt. % or 15 to 35 wt. % or 25 to 35 wt. % of indene and/or $C_{1-4}$-alkylindene and ethylenically unsaturated aromatic compounds, based on the total mass of the cyclic diolefin compound, indene and/or $C_{1-4}$-alkylindene, and ethylenically unsaturated aromatic compounds.

According to one embodiment, the cyclic diolefin compound is selected from the group consisting of cyclopentadiene, cyclopentadiene derivatives such as methylcyclopentadiene, ethylcyclopentadiene, pentamethylcyclopentadiene, ethyltetramethylcyclopentadiene, and mixtures thereof; and the aromatic component is an aromatic mixture that contains indene and/or $C_{1-4}$-alkylindene and at least one, in particular at least two, ethylenically unsaturated aromatic compounds respectively having, independently of one another, 8 to 15, preferably 8 to 13, carbon atoms; and the monomer mixture contains 5 to 40 wt. %, preferably 10 to 35 wt. % or 15 to 35 wt. % or 25 to 35 wt. % of ethylenically unsaturated aromatic compounds, based on the total mass of the cyclic diolefin compound, indene and/or $C_{1-4}$-alkylindene, and ethylenically unsaturated aromatic compounds.

According to a further embodiment, the cyclic diolefin compound is selected from the group consisting of cyclopentadiene, cyclopentadiene derivatives such as methylcyclopentadiene, ethylcyclopentadiene, pentamethylcyclopentadiene, ethyltetramethylcyclopentadiene dimers, and mixtures thereof; and the aromatic component is an aromatic mixture, wherein the aromatic mixture is a mixture containing 50 wt. % or less vinyl aromatics, such as styrene, α-methylstyrene, o-vinyltoluene, m-vinyltoluene, and p-vinyltoluene, 30 wt. % or less indene, and 15 wt. % or less $C_{1-4}$-alkylindene, based on the total mass of the mixture, or a mixture containing 60 wt. % or less indene and/or $C_{1-4}$-alkylindene, based on the total mass of the mixture; and the monomer mixture contains 5 to 40 wt. %, preferably 10 to 35 wt. % or 15 to 35 wt. % or 25 to 35 wt. % of indene and/or $C_{1-4}$-alkylindene and ethylenically unsaturated aromatic compounds, based on the total mass of the cyclic diolefin compound, indene and/or $C_{1-4}$-alkylindene, and ethylenically unsaturated aromatic compounds.

If a mixture having a low content of cyclic diolefin compound, for example a petroleum fraction, is used as the cyclic diolefin component, a cyclic diolefin compound consisting of one or more conjugated cyclodialkenes, for example cyclopentadiene, methylcyclopentadiene, pentamethylcyclopentadiene, ethylcyclopentadiene, and ethyltetramethylcyclopentadiene can also be added in order to set the monomer ratios stated above. The same applies to the aromatic component and indene and/or $C_{1-4}$-alkylindene and the ethylenically unsaturated aromatic compounds having 8 to 15, preferably 8 to 13, carbon atoms.

The monomer mixture can contain a non-polymerizable solvent. Suitable solvents are aromatic and naphthenic solvents or their hydrogenation products. Suitable solvents are therefore, for example, benzene, toluene, xylene, ethylbenzene, cyclohexane, dimethylcyclohexane, ethylcyclohexane or mixtures thereof. The solvent can preferably contain mono- or poly-, in particular mono- or di-, alkyl-substituted aromatic compounds having 7 to 10 carbon atoms, for example o-xylene, m-xylene, p-xylene, and/or ethylbenzene. These preferably have a boiling point of over 100° C., in particular over 130° C. If xylene is used as the solvent, this can be present as a pure compound or as a mixture of two or more of the isomers o-xylene, m-xylene, and p-xylene.

According to a preferred embodiment, a $C_8$-isomer mixture can be used as the solvent. The $C_8$-isomer mixture preferably comprises a mixture of o-xylene, m-xylene, p-xylene and ethylbenzene.

Petroleum fractions and constituents from tar distillation can already contain non-polymerizable constituents, for example non-polymerizable aromatics such as xylenes. The addition of a solvent can thus be dispensed with if a petroleum fraction is used as the cyclic diolefin component and/or a petroleum fraction, or a constituent from tar distillation is used as the aromatic component.

The monomer mixture can contain non-polymerizable constituents in an amount of 0 to 40 wt. %. The non-polymerizable solvent can be present in the monomer mixture in an amount of 0 to 40 wt. %, based on the mass of the monomer mixture. The monomer mixture preferably contains 5 to 35 wt. %, particularly preferably 5 to 30 wt. %, for example approximately 30 wt. %, non-polymerizable solvent, respectively based on the mass of the monomer mixture.

It is also conceivable that the monomer mixture contains non-polymerizable solvent and non-polymerizable constituents together in an amount of 0 to 40 wt. %, preferably 5 to 35 wt. %, more preferably 5 to 30 wt. %, for example approximately 30 wt. %, based on the mass of the monomer mixture. Finally, it is conceivable that the monomer mixture contains non-polymerizable constituents in an amount of 0 to 40 wt. %, preferably 5 to 35 wt. %, more preferably 5 to 30 wt. %, for example approximately 30 wt. %, based on the mass of the monomer mixture.

According to one embodiment, the method is performed substantially with the exclusion of oxygen. This can reduce the formation of by-products. In particular, the formation of acid groups and ester groups in the product can be avoided. This helps in achieving optimally colorless hydrogenated hydrocarbon resins. The cyclic diolefin components and/or the aromatic components or the aromatic mixture, in particular the storage container thereof, are preferably rendered inert with a protective gas such as nitrogen. The hydrocarbon resin and/or the hydrogenated hydrocarbon resin, in particular the storage containers for the hydrocarbon resin and/or for the hydrogenated hydrocarbon resin, are advantageously also rendered inert with a protective gas such as nitrogen.

In the method according to the invention, the monomer mixture can be heated quickly to the polymerization temperature. The monomer mixture is preferably heated at a rate of 20° C./minute to 200° C./minute, preferably 30° C./minute to 200° C./minute, more preferably 35° C./minute to 200° C./minute, even more preferably 35° C./minute to 140° C./minute, particularly preferably 35° C./minute to 80° C./minute or 35° C./minute to 70° C./minute. In particular, the aforementioned heating rates are used when heating the monomer mixture to the temperature at which the polymerization reaction begins, in particular up to a temperature of 180° C. to 235° C. As soon as the monomer mixture has reached a temperature above 180° C. or more, subsequent temperatures can also be set at heating rates other than those mentioned above. It was found that the amount of by-products is low at the heating rates according to the invention and low Mz values can be achieved at a given softening point.

Although the polymerization already starts at a temperature of 180° C., the polymerization in the method according to the invention can also be performed at higher temperatures. In the method according to the invention, the polymerization is performed at a temperature of 180° C. or higher. For example, the polymerization can be performed at a polymerization temperature of 200° C. to 300° C., or of 230° C. to 300° C., or of 240° C. to 280° C., or of 250° C. to 270° C.

The temperature can be changed during the polymerization. For example, the temperature can be increased to a final temperature during the polymerization. The changes in temperature can be organized in different ways. For example, the changes in temperature can be linear or abrupt. According to one embodiment, the aforementioned temperatures are final temperatures. These are reached at the end of the polymerization process. According to one embodiment, the temperature is kept substantially constant during the polymerization.

It has been found that the products have a low softening point and can be waxy if the polymerization is performed entirely at lower temperatures, in particular at temperatures below 240° C.

The polymerization can be performed at a pressure of 10 bar or more. For example, the pressure can be 10 to 25 bar, in particular 10 bar to 20 bar or 13 bar to 18 bar. If the polymerization is performed at less than 10 bar, the final product is of inferior quality. In addition, the yield is lower. Furthermore, the presence of a gas phase can largely be avoided by the aforementioned pressures. This allows better control of the reaction and better heat transfer.

The polymerization can be performed continuously or discontinuously. The polymerization is preferably performed continuously. The continuous mode of operation has the advantage that the heat transfer is better than in the discontinuous method. Furthermore, if the process is performed continuously, the operating costs are lower and the method can be performed more reliably.

The polymerization can be performed in various reaction containers. The polymerization is preferably performed continuously in a tubular reactor. This procedure has proven to be particularly advantageous given continuous polymerization. In the tubular reactor, the polymerization can in particular be performed for a retention time of 30 to 180 minutes, in particular of 40 to 120 minutes or of 50 to 90 minutes.

If the properties of the hydrocarbon resin obtained according to the invention are to be changed, some or all of the hydrocarbon resin obtained can be recycled into the tubular reactor. This measure will be useful, for example, when higher molecular weights of the hydrocarbon resin are to be achieved. The recycling takes place preferably into the raw material mixture of the input stream. The removal for recycling takes place preferably downstream of the reactor outlet and upstream of the separation of the oligomers from the product stream. In the method according to the invention, 0 to 90 wt. % of the product stream, preferably 25 to 75 wt. %, based on the mass of the product stream obtained, can be recycled into the monomer mixture of the input stream. Such recycling can be performed particularly easily in tubular reactors.

In the method according to the invention, oligomers which contain units originating from the cyclic diolefin compound and/or units originating from the aromatic component are separated from the product stream and fed back into the monomer mixture. After the polymerization, some, preferably all, of the oligomers and the optional non-polymerizable solvent are advantageously removed from the product stream by batchwise or preferably continuous evaporation. Advantageously, after the evaporation, some or preferably all of the oligomers are separated, batchwise or preferably continuously, from the optional non-polymerizable solvent by complete or preferably partial condensation. Advantageously, after the condensation, the oligomers are fed back, batchwise or preferably continuously, to the monomer mixture for further polymerization.

The oligomers can boil in particular at an absolute pressure of 100 mbar or less, in particular 50 mbar or less, preferably 30 mbar, and at a temperature of 80° C. or more, preferably of 80° C. to 120° C., more preferably of 90° C. to 120° C., even more preferably of 100° C. to 120° C. The oligomers particularly preferably boil at an absolute pressure of 50 mbar or less, preferably 30 mbar, and a temperature of 90° C. to 120° C., in particular 100° C. to 120° C. The recycling of the aforementioned oligomers can be achieved by operating a partial condenser under the aforementioned conditions, in which partial condenser the oligomers are separated from lower-boiling constituents.

Furthermore, the oligomers can preferably have a molecular weight of 100 to 600 g/mol, more preferably of 130 to 600 g/mol, particularly preferably of 150 to 600 g/mol.

It has been found that a high-quality hydrocarbon resin can be obtained by separating the oligomers from the product stream and then feeding the oligomers to the monomer mixture. In particular, a hydrocarbon resin having a PDI of 1 to less than 2.3 can be obtained. Moreover, in particular a hydrocarbon resin comprising indene and having a PDI of 1 to less than 2.3 can be obtained. In particular after their hydrogenation, these resins show good compatibility with mPO and APAO, in particular with mPO, APAO, and EVAC.

Furthermore, by separating the oligomers from the product stream obtained and subsequently feeding them into the monomer mixture in the method according to the invention, the polymerization can also be performed at a constant temperature without the formation of poorly soluble products. Furthermore, hydrocarbon resins which have little discoloration can thereby be obtained. Finally, recycling the oligomers can increase the yield.

The recycled oligomers can also contain non-polymerizable constituents and/or solvents.

Unreacted monomers can be thermally separated from the solvent and recycled again by adding them to the raw material mixture of the feed stream. This also increases the resin yield.

The method according to the invention can be implemented effectively by the selective separation of oligomers which boil in the aforementioned ranges or have the aforementioned molecular weights. In particular, the method according to the invention can be performed in steady-state operation with good yields by the selective separation of the oligomers. In addition, the raw material feed does not need to be adjusted. Furthermore, diluted raw materials such as petroleum fractions or fractions from tar processing can also be used.

The polymerization of the monomer mixture to form the hydrocarbon resin preferably takes place via a combination of Diels-Alder reactions and radical linkages of these poly-Diels-Alder products.

The hydrocarbon resin according to the invention can be obtained by means of the method described in the preceding.

The hydrocarbon resin according to the invention preferably comprises repeating units originating from the cyclic diolefin compound, and indene units and/or $C_{1-4}$-alkylindene units. In particular, the hydrocarbon resin can also comprise further units originating from the aromatic component. For example, the hydrocarbon resin can also contain units originating from styrene, α-methylstyrene, o-vinyltoluene, m-vinyltoluene, and/or p-vinyltoluene.

The preceding statements for the method according to the invention accordingly apply to the cyclic diolefin component, the cyclic diolefin compound, and the aromatic component of the hydrocarbon resin according to the invention.

The hydrocarbon resin according to the invention preferably has, at least in part, the general structural formula (I) from the ethylenically unsaturated aromatic compound, and has not undergone a Diels-Alder reaction with a cyclic diolefin compound.

In structural formula (I), in particular the order, the presence and the number of units with the variables p, q, r, s, t, and u can differ statistically for individual copolymer molecules of the hydrocarbon resin. The variables n, m, and o indicate whether one or more cyclic diolefin compounds

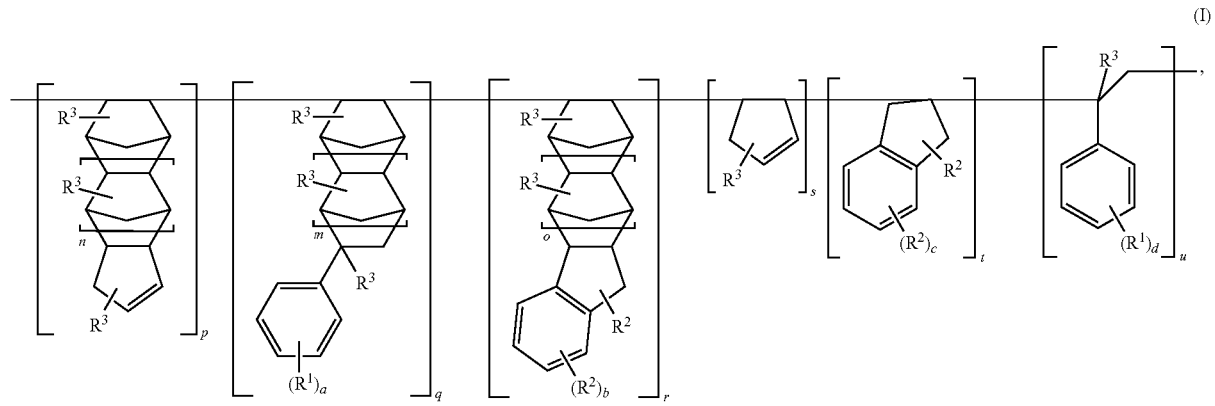

(I)

wherein each $R^1$ and each $R^2$ is selected, independently of one another, from the group consisting of —H, —CH$_3$, —C$_2$H$_5$, -n-C$_3$H$_7$, —CH(CH$_3$)$_2$, -n-C$_4$H$_9$, —CH$_2$CH(CH$_3$)$_2$, —CH(CH$_3$)(C$_2$H$_5$), and —C(CH$_3$)$_3$, each $R^3$ is, independently of one another, —H, —CH$_3$, or —C$_2$H$_5$, p, q, r, s, t, and u are, independently of one another, integers from 0 to 8, each n, each m, and each o are, independently of one another, integers from 0 to 6, preferably from 0 to 4, more preferably from 0 to 2, and each a, each b, each c, and each d are, independently of one another, integers from 1 to 4, preferably from 1 to 2, with the proviso that the hydrocarbon resin has a number-average molecular weight Mn of 200 to 600 g/mol, preferably of 220 to 500 g/mol, more preferably of 250 to 400 g/mol, and contains indene units and/or C$_{1-4}$-alkylindene units.

Accordingly, the resin is preferably a copolymer which, by radical linkage, interconnects different units that are contained in the cyclic diolefin component and the aromatic component, or are Diels-Alder reaction products of constituents of the cyclic diolefin component and/or the aromatic component. The unit denoted by the variable p in structural formula (I) is the result of single or multiple Diels-Alder reactions of cyclic diolefin compounds. The units denoted by the variables q and r in structural formula (I) are the result of the Diels-Alder reaction of cyclic diolefin compounds with ethylenically unsaturated aromatic compounds or indene or C$_1$-C$_4$ alkylindene, with additional cyclic diolefin compounds optionally being incorporated by Diels-Alder reactions. The unit denoted by the variable s in structural formula (I) is a cyclic diolefin compound incorporated by radical linkage which has not undergone a Diels-Alder reaction. The unit denoted by the variable t in structural formula (I) is an indene unit or C$_{1-4}$-alkylindene unit incorporated by radical linkage which has not undergone a Diels-Alder reaction with a cyclic diolefin compound. The unit denoted by the variable u in structural formula (I) is a unit which is incorporated by radical linkage, originates are linked to one another by Diels-Alder reactions in the respective units. Advantageously, for the unit denoted by the variable p in structural formula (I), it applies that if p is greater than 1, each n, independently of one another, can be an integer from 0 to 6, preferably from 0 to 4, more preferably from 0 to 2. The same applies for the units denoted by the variables q and r in structural formula (I).

The sum of the variables p, q, r, s, t, and u is preferably at least 1, more preferably from 1 to 10, even more preferably from 1 to 8, particularly preferably from 2 to 6.

As shown in structural formula (I), the different units can be substituted. The aromatic units can in particular be polysubstituted.

The hydrocarbon resin according to the invention has a PDI of 1 to less than 2.3. The hydrocarbon resin preferably has a polydispersity index (PDI) of 1 to 2.1, preferably of 1.5 to 2.0, more preferably of 1.5 to 1.95. It has been found that hydrocarbon resins having the aforementioned PDIs have very good compatibility with base polymers of hot-melt adhesives, in particular with mPO, APAO, and EVAC.

The hydrocarbon resin according to the invention preferably contains 1 to 20 wt. %, preferably 4 to 20 wt. %, more preferably 4 to 16 wt. %, even more preferably 5 to 15 wt. %, particularly preferably 7 to 13 wt. %, based on the total mass of the hydrocarbon resin, indene units and/or C$_{1-4}$-alkylindene units. It has been found that hydrocarbon resins having the aforementioned amounts of indene units and/or C$_{1-4}$-alkylindene units have very good compatibility with base polymers of hot-melt adhesives, in particular with mPO, APAO, and EVAC.

The indene content in the hydrocarbon resin can be determined, for example, by means of pyrolysis gas chromatography using a flame ionization detector (FID). This method can also be used to determine the content of the remaining units in the hydrocarbon resin.

The hydrocarbon resin preferably contains 40 to 85 wt. %, more preferably 45 to 70 wt. %, even more preferably 45 to 65 wt. %, of units originating from the cyclic diolefin compound, based on the total mass of the hydrocarbon resin.

If a mixture containing indene and/or $C_{1-4}$-alkylindene and at least one, in particular at least two, ethylenically unsaturated aromatic compounds respectively having, independently of one another, 8 to 15, preferably 8 to 13, carbon atoms is used as the aromatic component, the hydrocarbon resin can preferably also have, in addition to indene units and/or $C_{1-4}$-alkylindene units, further units originating from the ethylenically unsaturated aromatic compounds. The hydrocarbon resin preferably contains 5 to 25 wt. %, preferably 10 to 25 wt. %, more preferably 15 to 25 wt. %, indene units and/or $C_{1-4}$-alkylindene units and units originating from ethylenically unsaturated aromatic compound, based on the total mass of the hydrocarbon resin.

The hydrocarbon resin preferably has an Mz of 800 to 2450 g/mol, preferably of 800 to 1800 g/mol, more preferably of 800 to 1750 g/mol, even more preferably of 800 to 1700 g/mol.

Various molecular weights are known to a person skilled in the art. Said person thus knows the number-average molecular weight Mn, the weight-average molecular weight Mw, and the centrifuge-average molecular weight Mz. In the present case, the centrifuge-average molecular weight Mz is also abbreviated as molecular weight Mz. The ratio Mw/Mn of the number-average molecular weight Mn and the weight-average molecular weight Mw is referred to as polydispersity PDI.

Methods for determining the molecular weights Mn, Mw, and Mz are known to a person skilled in the art. For example, said person can determine the molecular weights Mn, Mw, and Mz with the aid of gel permeation chromatography or by means of mass spectrometry, preferably by gel permeation chromatography. For measurements by gel permeation chromatography, THF is preferably used as eluent. Polystyrene is preferably used as a calibration standard. The measurements by gel permeation chromatography are advantageously performed using linear columns with a porosity of 1,000 Å. Refractive index and UV detectors are preferably used. In addition to the molar mass, the degree of hydrogenation of a molar mass portion can also be indicated using a UV detector.

Furthermore, the hydrocarbon resin preferably has an Mn of 200 to 600 g/mol, more preferably of 220 to 500 g/mol, particularly preferably of 250 to 400 g/mol. The hydrocarbon resin according to the invention advantageously has an Mw of 300 to 800 g/mol, preferably of 400 to 800 g/mol, particularly preferably of 500 to 800 g/mol.

As is evident to a person skilled in the art, the molecular weights given for the oligomers are not directly comparable with the preferred number-average or weight-average molecular weights given for the hydrocarbon resins according to the invention. This is due in particular to the fact that the molecular weights for the oligomers are absolute molecular weights, whereas the preferred molecular weights given for the hydrocarbon resins according to the invention are relative molecular weights with respect to polystyrene standards having the aforementioned molecular weights.

The hydrocarbon resin preferably has a softening point, determined by the ring and ball method in accordance with the ASTM D3461 standard, of 80° C. to 140° C., preferably of 90° C. to 130° C., more preferably of 100° C. to 120° C.

The hydrocarbon resin according to the invention may also have a slight coloration. The hydrocarbon resin preferably has a Gardner color number of 14 or less, preferably of 12 or less, more preferably 11 or less. The hydrocarbon resin according to the invention thereby has good hydrogenation ability and good compatibility with other components, for example in hot-melt adhesives, rubber products, bitumen, and printing inks.

The Gardner color number is preferably determined according to ISO 4630, in particular ISO 4630:2015.

The hydrocarbon resin according to the invention is preferably not hydrogenated. In particular, the hydrocarbon resin according to the invention can have a content of aromatic protons in the $^1$H-NMR spectrum, based on the total amount of protons in the $^1$H-NMR spectrum, of 1% to 30%, in particular of 2% to 25%, or of 3% to 20%. In particular, the hydrocarbon resin according to the invention can have a content of olefinic protons in the $^1$H-NMR spectrum, based on the total amount of protons in the $^1$H-NMR spectrum, of 1% to 20%, in particular of 1% to 10% or of 3% to 10%. $^1$H-NMR spectra are preferably measured in $CDCl_3$. Aromatic protons appear in the $^1$H-NMR spectrum in $CDCl_3$, preferably in the range of 6.01 ppm to 8.00 ppm. Olefinic protons appear in the $^1$H-NMR spectrum in $CDCl_3$ preferably in the range of 5.00 ppm to 6.00 ppm.

Furthermore, the hydrocarbon resin according to the invention can be hydrogenated effectively. In particular, the hydrocarbon resin according to the invention is soluble at room temperature in a mixture of saturated hydrocarbons which are liquid at room temperature, in particular refined gasolines free of aromatics. Such mixtures are commercially available under the name D40, for example Exxsol D40 or Shellsol D40.

Furthermore, the hydrocarbon resin according to the invention can be hydrogenated to a Yellowness Index of 5 or less, preferably of 3 or less, particularly preferably of 1 or less, within 0.5 to 5 hours, preferably 0.5 to 3 hours, particularly preferably 0.75 to 1.5 hours. The Yellowness Index is determined according to the ASTM D1209-05 (2011) or ISO 6271:2015 standard. Hydrocarbon resins which can be effectively hydrogenated can be hydrogenated technically more simply and inexpensively. The obtained hydrogenated hydrocarbon resins have good compatibility with other components, for example in hot-melt adhesives. Since they have little discoloration, they can also be used for a wide range of applications.

A high degree of hydrogenation can be achieved during hydrogenation. For example, the hydrocarbon resin according to the invention can be hydrogenated to a residual aromatic content of less than 0.2%, preferably less than 0.15%, particularly preferably less than 0.09%. Low residual aromatic contents result in more stable hydrocarbon resins with regard to discoloration.

According to one embodiment, the hydrocarbon resin according to the invention is obtained by the method according to the invention, in particular by the method described in the preceding.

The hydrocarbon resin according to the invention can be used directly for the applications mentioned herein, in particular for adhesive applications.

The hydrocarbon resin according to the invention can also be processed further, in particular after the solvent, unreacted monomer, and oligomers have been separated. In particular, the hydrocarbon resin according to the invention can be functionalized and/or hydrogenated.

To this end, hydrogenation can be performed after the polymerization in the method according to the invention. By hydrogenating the hydrocarbon resin, a hydrogenated hydrocarbon resin is obtained. Accordingly, the hydrocarbon resin is preferably partially or completely hydrogenated in a subsequent hydrogenation step in order to obtain a hydrogenated hydrocarbon resin.

The hydrocarbon resin can in particular be partially or completely hydrogenated. The hydrogenation is preferably performed in the presence of a catalyst. Various catalysts can be used as the catalyst. For example, nickel-, palladium-, cobalt-, platinum-, and rhodium-based catalysts can be used in the hydrogenation. Nickel is advantageously used as the catalyst. The aforementioned catalysts can be applied to a substrate such as aluminum oxide, silicon dioxide, zeolites, clay minerals such as montmorillonite, and silicon carbide. The hydrogenation of the hydrocarbon resin is preferably performed in the presence of a nickel catalyst. According to a further preferred embodiment, a nickel catalyst is used on an aluminum oxide/silicon oxide substrate. These catalysts are commercially available. The nickel catalyst can in particular be present in heterogeneous form. As a result, it can be easily removed by filtration after the hydrogenation has ended.

The term "partial hydrogenation" is understood to mean that predominantly olefinic double bonds are hydrogenated, or that some of the aromatic units of the hydrocarbon resin are also hydrogenated. The hydrocarbon resin is preferably completely hydrogenated in the hydrogenation. In complete hydrogenation, advantageously at least 70%, preferably at least 90%, more preferably at least 95%, particularly preferably at least 99%, of the olefinic double bonds and advantageously at least 70%, preferably at least 90%, more preferably at least 95%, particularly preferably at least 99%, of the aromatic double bonds are hydrogenated. In partial hydrogenations, preferably at least 70%, more preferably at least 90%, even more preferably at least 95%, particularly preferably at least 99%, of the olefinic double bonds and advantageously 50% or less, preferably 30% or less, more preferably 10% or less, of the aromatic double bonds are hydrogenated.

Complete hydrogenation has the advantage that fewer by-products are formed by post-reactions, and thus discoloration in the hydrocarbon resin can be avoided as far as possible.

Whether the hydrocarbon resin has been partially or completely hydrogenated can be determined by means of NMR spectroscopy, in particular by determining the content of aromatic and/or olefinic double bonds by means of $^1$H-NMR spectroscopy. The residual aromatic content preferably indicates the content of aromatic protons, based on the total amount of protons in the $^1$H-NMR spectrum.

The hydrogenation can be performed in the presence of a solvent, in particular an aliphatic solvent. A mixture of saturated hydrocarbons which are liquid at room temperature, preferably having a boiling point between 155° C. and 170° C., more preferably between 160° C. and 165° C., can also be used as the solvent. Suitable solvents are, for example, refined gasolines. Such mixtures are commercially available under the name D40, for example Exxsol D40 or Shellsol D40. The viscosity of the hydrocarbon resin can be reduced by adding the solvent. Furthermore, the use of an aliphatic solvent such as D40 can save hydrogen compared with the use of an aromatic solvent.

Preferably, 80 wt. % or more, in particular 90 wt. % or more or 100 wt. % or more, based on the mass of hydrocarbon resin, of solvent can be added to the hydrocarbon resin. A hydrogenation mixture containing hydrocarbon resin and solvent is preferably used. The hydrogenation mixture is advantageously a solution. The hydrogenation mixture preferably comprises 50% hydrocarbon resin.

The hydrogenation can be performed discontinuously or continuously. The hydrogenation is preferably performed continuously. The continuous or discontinuous hydrogenation is independent of the polymerization to form the non-hydrogenated hydrocarbon resin. The polymerization can thus be performed continuously and the hydrogenation can be performed discontinuously, or vice versa. Furthermore, the polymerization and the hydrogenation can be performed continuously. Finally, the polymerization and the hydrogenation can be performed discontinuously.

The hydrogenation can advantageously be performed in a loop reactor. The hydrogenation mixture is expediently circulated during the hydrogenation. The loop reactor advantageously has a gas-liquid ejector. By using a loop reactor in combination with a gas-liquid ejector, the hydrocarbon resin to be hydrogenated can be particularly well mixed with hydrogen and the optionally added catalyst, as a result of which the hydrogenation time can be shortened.

The hydrogenation is preferably performed at a pressure of more than 60 bar, in particular of 65 bar to 105 bar, or of 65 bar to 100 bar, or of 70 bar to 95 bar. In this way, the hydrogenation of the hydrocarbon resin can be set to the desired degree of hydrogenation.

The hydrogenation is also preferably performed at a temperature of 240° C. or higher, in particular of 240° C. to 300° C. or of 250° C. to 280° C. It was found that the hydrogenation proceeds slowly at a hydrogenation temperature below 240° C., and increasingly more by-products can form at temperatures above 300° C.

In a loop reactor customarily used on an industrial scale, the hydrogenation can be performed for 50 to 160 minutes, preferably 60 to 150 minutes, and particularly preferably 80 to 150 minutes. In this way, the desired degree of hydrogenation of the hydrogenated hydrocarbon resin and the brightness can be set.

According to a particularly preferred embodiment of the invention, an expansion stage is provided both after the polymerization and after the hydrogenation. The first expansion stage after the polymerization serves to remove highly volatile components, in particular solvent and/or unreacted monomer and/or oligomer, from the product stream. By utilizing the pressure differential in the first expansion stage, the product stream is flashed, as a result of which the more highly volatile components are removed. The product stream containing the hydrocarbon resin can preferably be introduced into the first expansion stage at a temperature of 200° C. to 300° C., particularly preferably at a temperature of 220° C. to 260° C. or 230° C. to 250° C.

After the first expansion stage, the hydrocarbon resin preferably contains only 3 wt. % or less, preferably 1 wt. % or less, more preferably 0.5 wt. % or less, of solvent and/or unreacted monomer, respectively based on the mass of the hydrocarbon resin.

In the first expansion stage, the absolute pressure can be reduced to 1 bar or less, preferably 0.1 bar or less and particularly preferably to 0.03 bar or less. The drop in pressure means that complex stirred systems such as thin-film evaporators or water stripping devices can be dispensed with. This means that the method can be performed more cost-effectively and in a manner less susceptible to failure. A thin-film evaporator can, however, be used in the method after the polymerization and the subsequent first expansion stage. As a result, a low content of solvent can be achieved in the hydrocarbon resin after the polymerization.

A second expansion stage can preferably be provided after the hydrogenation. In the second expansion stage, at least some of the volatile constituents, in particular of the solvent, can be removed from the hydrogenated hydrocarbon resin without a large amount of by-products being produced by additional thermal stress and without impairing the color indices of the resin. After the second expansion stage, the hydrogenated hydrocarbon resin preferably has 2 wt. % or less, preferably 0.5 wt. % or less or 0.03 wt. % or less, of solvent, respectively based on the mass of the hydrogenated hydrocarbon resin.

The pressure reduction in the second expansion stage can be performed in two expansion steps. In a first expansion step, the absolute pressure can be reduced to 0.5 bar or less, preferably 0.2 bar or less, preferably 0.05 bar or less or particularly preferably to 0.01 bar or less. After the hydrogenation, the catalyst is preferably removed first. The catalyst can be removed by filtration, for example. The hydrogenation mixture is preferably introduced into the first expansion step at a temperature of 190° C. to 270° C., more preferably of 200° C. to 260° C., even more preferably of 210° C. to 250° C., yet more preferably of 220° C. to 240° C., still more preferably of 230° C. After the first expansion step, the hydrogenation mixture can be introduced into the second expansion step at a temperature of 190° C. to 270° C., preferably of 200° C. to 260° C., particularly preferably of 210° C. to 250° C. or of 220° C. to 240° C. In the second expansion step, the absolute pressure can preferably be reduced to 0.1 bar or less, preferably 0.05 bar or less, more preferably 0.03 bar or less, even more preferably 0.01 bar or less.

In addition, the hydrogenation mixture, from which the previously optionally added catalyst has been removed, can be introduced into a pre-expansion stage immediately before the second expansion stage. The hydrogenation mixture can have a temperature of 240° C. to 300° C., preferably of 250° C. to 290° C., and particularly preferably of 260° C. to 280° C. In the pre-expansion stage, the overpressure can preferably be reduced to 3 bar or less, preferably 2 bar or less, more preferably 1.5 bar or less, even more preferably 1 bar or less.

If a pre-expansion stage is provided, the mixture removed from the pre-expansion stage is preferably introduced into the second expansion stage.

By implementing one or more expansion stages, the period of time in which the hydrocarbon resin and/or the hydrogenated hydrocarbon resin is kept at a high temperature can be reduced. This measure can also serve to reduce by-products.

According to one embodiment, two flash evaporation steps are provided after the hydrogenation. These two flash evaporation steps preferably form the second expansion stage. For this purpose, the catalyst is preferably first removed. The catalyst can be removed by filtration, for example. Subsequently, in the first flash evaporation step, the preferably catalyst-free hydrogenation mixture is conducted into a first pressurized container. The pressure in the first pressurized container is lower than the pressure of the hydrogenation mixture. The pressure of the hydrogenation mixture in the first pressurized container is preferably reduced to an absolute pressure of 3 bar or less, preferably 2 bar or less, more preferably 1.5 bar or less, even more preferably 1 bar or less. In this way, in particular hydrogen can be removed from the hydrogenation mixture.

In the second flash evaporation step, the resulting mixture is conducted into a second pressurized container. The pressure in the second pressurized container is lower than the pressure of the resulting mixture. The pressure of the resulting mixture in the second pressurized container is preferably reduced to 0.1 bar or less, preferably 0.05 bar or less, particularly preferably 0.03 bar or less. In particular, solvents can thus be removed. After the second flash evaporation step, a thin-film evaporator is advantageously provided which is operated at 0.01 bar or less, preferably at 0.005 bar or less, more preferably at 0.003 bar or less. In this way, the solvent can be largely removed from the hydrogenated hydrocarbon resin.

The hydrogenation mixture is preferably introduced into the first flash evaporation step at a temperature of 190° C. to 270° C., more preferably of 200° C. to 260° C., even more preferably of 210° C. to 250° C., yet more preferably of 220° C. to 240° C., still more preferably of 230° C. After the first flash evaporation step, the hydrogenation mixture can be introduced into the second flash evaporation step at a temperature of 190° C. to 270° C., preferably of 200° C. to 260° C., particularly preferably of 210° C. to 250° C., or of 220° C. to 240° C. After the second flash evaporation step, the hydrogenation mixture can be introduced into the thin film evaporator at a temperature of 180° C. to 260° C., preferably of 190° C. to 250° C., particularly preferably of 200° C. to 240° C. or of 210° C. to 230° C.

The hydrogenated hydrocarbon resin according to the invention is obtainable by hydrogenating a hydrocarbon resin according to the invention, and/or by the method described herein.

The olefinic double bonds are preferably present in the hydrogenated hydrocarbon resin in a form in which they are at least 70% hydrogenated, preferably at least 90% or at least 95% or at least 99%. Partial or complete hydrogenation of the olefinic double bonds can reduce the formation of discoloration in the hydrogenated hydrocarbon resin. Alternatively or additionally, the aromatic double bonds can be in a form in which they are at least 70% hydrogenated, preferably at least 90% or at least 95% or at least 99%. Partial or complete hydrogenation of the aromatic double bonds can reduce the formation of discoloration in the hydrogenated hydrocarbon resin. More stable resins are obtained.

The hydrogenated hydrocarbon resin advantageously has a residual content of olefinic double bonds of less than 0.1%, preferably less than 0.05%, particularly preferably less than 0.01%, and a residual aromatic content of less than 0.2%, preferably less than 0.15%, particularly preferably less than 0.09%. The content of double bonds can be determined by means of $^1$H-NMR spectroscopy.

The hydrogenated hydrocarbon resin preferably has an Mz of 800 to 2500 g/mol, preferably of 800 to 1800 g/mol, more preferably of 800 to 1600 g/mol, particularly preferably of 800 to 1400 g/mol. Furthermore, the hydrogenated hydrocarbon resin advantageously has an Mn of 200 to 600 g/mol, preferably of 220 to 500 g/mol, particularly preferably of 220 to 400 g/mol. The hydrogenated hydrocarbon resin preferably has an Mw of 300 to 800 g/mol, more preferably of 250 to 700 g/mol, particularly preferably of 300 to 600 g/mol.

The hydrogenated hydrocarbon resin preferably has a polydispersity index of 1 to less than 2.3, preferably of 1.5 to 2.2, particularly preferably of 1.5 to 2.1.

The softening point of the hydrogenated hydrocarbon resin, according to the ring and ball method in accordance with the ASTM D3461 standard, is preferably 80° C. to 140° C., preferably 90° C. to 130° C. or 90° C. to 125° C.

Furthermore, the hydrogenated hydrocarbon resin can have a Hazen color number of 40 or less, in particular of 25 or less. The Hazen color number is determined according to the DIN EN ISO 6271:2016-05 standard. The Hazen color number can also be referred to as the platinum cobalt color number.

The hydrogenated hydrocarbon resin advantageously has a Yellowness Index of 3 or less, preferably 1 or less. The Yellowness Index is determined according to the ASTM D1209-05 (2011) standard.

The aforementioned advantages of the hydrocarbon resin, in particular the good compatibility, low coloration, versatile applicability, and good stability, apply accordingly to the hydrogenated hydrocarbon resin.

The subject matter of the invention is also a composition comprising
- a hydrocarbon resin according to the invention or a hydrogenated hydrocarbon resin according to the invention, and
- an adhesive base polymer, for example a metallocene polyolefin or an ethylene-vinyl acetate copolymer or an amorphous polyalphaolefin or a styrene block copolymer.

A further subject matter of the invention is the use of a hydrocarbon resin according to the invention, or a hydrogenated hydrocarbon resin according to the invention, as a tackifying agent or tackifier in hot-melt adhesives, in particular in hot-melt adhesives based on metallocene polyolefin, ethylene-vinyl acetate copolymer, amorphous polyalphaolefins, or styrene block copolymers, and/or in solvent-containing adhesives, in particular in solvent-containing styrene block copolymer adhesives.

The subject matter of the invention is also the use of the hydrocarbon resin as a modifier in rubber products, in particular to improve the mechanical and dynamic properties in rubber products, in bitumen, in particular as an additive and/or as a hydrophobizing agent in bitumen, in particular for asphalt, or as a modifier and/or hydrophobizing agent in printing inks.

Moreover, the subject matter of the invention is use of the hydrogenated hydrocarbon resin as an additive in paint; in plastics material, in particular as a modifier in plastics material; in rubber; in bitumen, in particular as a hydrophobizing agent in bitumen, for example for roofing felt; in polypropylene films, in particular as a modifier and/or hydrophobizing agent in polypropylene films, in particular BOPP films; in cosmetics; or as tackifiers in adhesive compositions, in particular for applications in the hygiene product industry and for use in food packaging.

EXAMPLES

The invention is explained in more detail below using an exemplary, non-limiting production of a hydrocarbon resin with subsequent hydrogenation to produce a hydrogenated hydrocarbon resin. The specified pressures are absolute pressures.

In the continuous polymerization method shown schematically in FIG. 1, a petroleum fraction (available as BN-200 from Dow Chemical, hereinafter referred to as BN-200), which is rich in dicyclopentadiene, methylcyclopentadiene dimers, and cyclopentadiene-methylcyclopentadiene dimers (hereinafter referred to as cyclic diolefin compound), is located in the supply tank 11. The BN-200 contains approximately 50 wt. % cyclic diolefin compound, approximately 2.5 wt. % indene and $C_{1-4}$-alkylindene, approximately 6 wt. % ethylenically unsaturated aromatic compounds, and approximately 41.5 wt. % non-reactive components, respectively based on the total mass of BN-200. In the supply tank 12, a further petroleum fraction (hereinafter referred to as C9 fraction) is located which is rich in styrene, vinyltoluenes, indene, and methylindenes (hereinafter referred to as ethylenically unsaturated aromatics). The C9 fraction is an aromatic mixture. The C9 fraction contains approximately 27 wt. % indene and alkylindene derivatives, 1 wt. % styrene, 12.5 wt. % alkyl derivatives of styrene, and approximately 59.5 wt. % non-reactive components. Supply tank 13 contains dicyclopentadiene having a purity of at least 95%. Supply tank 14 contains xylene as an inert solvent.

General Implementation of the Experiment

A monomer mixture is produced in the receiver 15 from the supply tanks 11, 12, 13, and 14. When it is introduced into the receiver 15, the monomer mixture is mixed by means of a static mixer. The receiver 15 can also have a stirrer for mixing. The constituents BN-200, C9 fraction, pure dicyclopentadiene, and xylene are taken from the supply tanks 11, 12, 13, and 14 in such an amount that the monomer mixture contains cyclic diolefin compound and ethylenically unsaturated aromatics in a ratio of approximately 2:1 to approximately 4:1, based on the mass of the cyclic diolefin compound and ethylenically unsaturated aromatics in the monomer mixture. The ratio can be set in particular by adding pure dicyclopentadiene from the supply tank 13. The monomer mixture also contains 40% inert components, based on the mass of the monomer mixture.

The mixture is first introduced into the heater 16 with a feed stream of 10 kg/h from the receiver 15. In the heater 16, the monomer mixture is brought to a temperature of 195° C. and then polymerized in the tubular reactor 20. The temperature of the monomer mixture is increased to 195° C. in the heater 16 at a heating rate of approximately 68° C./minute. The monomer mixture is located in the heater 16 only during the heating and is transferred to the tubular reactor 20 directly afterward. Accordingly, the monomer mixture has a total residence time in the heater 16 of approximately 2.5 minutes. Due to the short residence time, which is less than 20 seconds, in particular at a reaction-relevant temperature of 180° C. or higher, product-forming reactions do not take place to any significant extent in the heater 16. In the tubular reactor 20, the temperature of the monomer mixture is increased at a heating rate of approximately 20° C./minute to 265° C., wherein the reaction products of the cyclic diolefin compound and the ethylenically unsaturated aromatics are formed by polymerization of the monomer mixture. The pressure in the tubular reactor 20 is 13 bar. The retention time in the tubular reactor 20 is 60 minutes. While heating up and during the polymerization, the monomer mixture is substantially single-phase liquid.

10 kg/h are removed from the exiting stream at the outlet of the tubular reactor 20 and added again to the monomer mixture via line 23 at the inlet of the tubular reactor 20. In addition, 5 kg/h of oligomers, which are separated from the hydrocarbon resin and from the inert solvent in the later course of the process, are admixed again to the monomer mixture. Thus, 25 kg/h of monomer mixture with recycled reactor product stream and recycled oligomer are continuously supplied to the tubular reactor 20.

After removal of the 10 kg/h of reactor product stream, a product stream of 15 kg/h of hydrocarbon resin, solvent, residual monomers, and oligomers is obtained from the tubular reactor 20 and introduced into the flash evaporator 21. The stream enters the flash evaporator 21 at a temperature of 265° C. and a pressure of 13 bar. In the flash evaporator 21, the pressure of the stream is reduced to 30 mbar. The contents of solvent and unreacted monomer and oligomer in the hydrocarbon resin are thereby reduced to 0.5 wt. % or less. The bottom product from the flash evaporator 21, which consists substantially of hydrocarbon resin, is supplied as a bottom product stream of 7 kg/h to the intermediate storage tank 22. A vapor stream of 8 kg/h comprising solvent, unreacted monomers, and oligomers is discharged overhead from the flash evaporator 21. In order to even further purify the bottom product from the flash evaporator 21, a thin-film evaporator can be used after the flash evaporator 21. The not yet hydrogenated hydrocarbon resin can be removed from the intermediate storage tank 22 via the line 22'.

The vapor stream from the flash evaporator 21 is conducted into the partial condenser 24, in which the oligomers are separated as a liquid phase, and the solvent and unreacted monomers are separated as a vapor phase. The oligomers are supplied to the monomer mixture as an oligomer stream of 5 kg/h at the inlet of the tubular reactor 20 via line 24'. Solvents and unreacted monomers are carried away via line 24". The partial condenser is operated at a pressure of 30 mbar and a temperature of 110° C. As a result, oligomers are selectively recycled to the monomer mixture, whereas non-reactive substances are largely removed. Despite the use of petroleum fractions, the method can thus be operated in a stable manner without adjusting the raw material feed.

Properties of the Hydrocarbon Resins

Various monomer mixtures and the resulting hydrocarbon resins are depicted in the following Table 1.

The indene content was determined by means of pyrolysis gas chromatography with flame ionization detection. The respective hydrocarbon resin was applied to a platinum filament and introduced into a pyrolysis chamber, for example Pyrola 2000 made by Porylab. The pyrolysis chamber was connected to a gas chromatograph, e. g., Thermo Trace GC Ultra, with a 60 m capillary column (e.g. Optima 1 MS with 0.25 μm film thickness made by Macherey-Nagel), the outlet of which was coupled to a flame ionization detector. The pyrolysis was effected by rapid heating of the platinum filament to 600° C. The platinum filament was mounted directly in the helium carrier gas stream, which transported the pyrolysis fragments to the gas chromatograph for separation.

Hydrogenation of the Hydrocarbon Resin 250 g of the hydrocarbon resins 1 to 5 are respectively taken, in five different hydrogenations, from the intermediate storage tank 22 and are dissolved in 250 g of Shellsol D40 while stirring. 500 g of the resulting solution is introduced into an autoclave (1 L autoclave from Parr Instruments, 4530 Series reactor). A nickel catalyst on silica is then added with stirring (0.75 wt. % of nickel catalyst, based on the total mass of the resin solution). The reactor is then closed and tested for tightness at 50° C. with nitrogen at a pressure of 40 bar. After the tightness has been confirmed, the nitrogen is exchanged for hydrogen and the outlet of the reactor is closed.

TABLE 1

Monomer mixtures and properties of the obtained hydrocarbon resins

| | Monomer mixture | | Properties of hydrocarbon resin | | | | | | |
|---|---|---|---|---|---|---|---|---|---|
| No. | CD | VA | Indene | Mn | Mw | PDI | Mz | EP | Gardner |
| 1 | 68 | 32 | 10.6 | 294 | 666 | 2.27 | 1925 | 83.3 | 14.1 |
| 2 | 70 | 30 | 9.2 | 375 | 715 | 1.91 | 1550 | 88.2 | 11.1 |
| 3 | 70 | 30 | 9.1 | 385 | 734 | 1.91 | 1658 | 87.7 | 11.5 |
| 4 | 80 | 20 | 4.4 | 388 | 784 | 2.02 | 1703 | 93.4 | 11.3 |
| 5* | 85 | 15 | 1.9 | 342 | 997 | 2.92 | 2928 | 106.8 | 9 |
| 6** | 68 | 32 | 10.2 | 276 | 805 | 2.92 | 5018 | 94 | 11.4 |

Explanations for Table 1:
CD - content of cyclic diolefin compound in the monomer mixture in wt. %, based on the mass of cyclic diolefin compound, indene or indene derivatives, and ethylenically unsaturated aromatics;
VA - content of ethylenically unsaturated aromatics in the monomer mixture, based on the mass of cyclic diolefin compound, indene or indene derivatives, and ethylenically unsaturated aromatics;
Indene - indene content in the resin in wt. %, based on the total mass of the resin;
Mn - number-average molecular weight in g/mol;
Mw - weight-average molecular weight in g/mol;
PDI - polydispersity index;
Mz - centrifuge-average molecular weight in g/mol;
EP - softening point in accordance with ASTM D3461 in ° C.;
Gardner - Gardner color number in accordance with ISO 4630;
*comparative example in which the oligomers were not returned to the monomer mixture and in which pure BN-200 and no C9 fraction was used;
**comparative example in which the oligomers were not returned to the monomer mixture.

The molecular weights Mn, Mw, and Mz were determined by means of gel permeation chromatography. THF was used as eluent; the operating characteristic was isocratic at an oven temperature of 40° C. In addition to a linear cross-linked polystyrene precolumn, three further linear cross-linked polystyrene columns having a porosity of 1000 Å each were used. A refractive index detector and a UV detector were used as detectors. A polystyrene kit (Ready Cal Kit from PSS) with polystyrene standards of 266 g/mol to 66,000 g/mol and a standard with a mass of 162 g/mol were used for calibration.

To start the reaction, the hydrogen pressure is increased to 40 bar. The reaction mixture is then heated to a reaction temperature of 265 to 270° C. within a period of 45 to 50 minutes using a heat exchanger operated with heating oil. After the reaction temperature has been reached, the hydrogen pressure is slowly adjusted to 85 bar. For the hydrogenation, the reaction mixture is kept for a further 3 to 5 hours at 265° C. and 85 bar with continuous dosage of additional hydrogen. The hydrogenation is considered complete when the hydrogen consumption in the reactor is below 0.5 L/h.

After the reaction has ended, the hydrogen feed stream and the heating oil are switched off. The reactor is again filled with nitrogen and cooled to approximately 70° C. within approximately 1 hour. The resin solution containing hydrogenated hydrocarbon resin is then filtered and filled into a three-necked flask.

The resin solution obtained after hydrogenation is distilled by steam stripping. For this purpose, the resin solution is heated to 180° C. in the three-necked flask, and steam at a temperature of 360° C. is passed through the resin solution via a dip tube. In addition, the flask is connected to a vacuum pump via a cold trap so that distillation can be performed gently at a pressure of approximately 10 mbar.

Usually, the solvent is largely separated after approximately 2 hours of distillation. Before the hot, liquid hydrogenated resin is bottled, 0.5 wt. % antioxidant, based on the mass of the hydrogenated resin, for example Irganox 1010, is added and homogenized.

In this way, the hydrogenated hydrocarbon resins 1-H, 2-H, 3-H, 4-H, 5-H, and 6-H are obtained from the hydrocarbon resins 1, 2, 3, 4, 5, and 6.

The polymerization described above can also be performed discontinuously. The hydrogenation described above can also be operated continuously.

The method described in the preceding example can also be performed substantially with the exclusion of oxygen.

Properties of the Hydrogenated Hydrocarbon Resins

The hydrogenated hydrocarbon resins 1-H to 6-H are fully hydrogenated. They have a residual content of olefinic double bonds of less than 0.01% and a residual aromatic content of less than 0.1%. The hydrogenated hydrocarbon resins 1-H to 6-H respectively have a VOC content of less than 300 ppm. Furthermore, the hydrogenated hydrocarbon resins 1-H to 6-H have the following properties listed in Tables 2 and 3.

The compatibility of the resins was determined by determining the cloud point according to the method described below. For each of the resins 1-H to 6-H, a mixture of 3 g of a base polymer with 3 g of the relevant resin was prepared. The mixture was then heated in a test tube having an inside diameter of 16 mm, in an oil bath, until a clear solution was obtained, wherein the maximum temperature was 260° C. After heating, the test tube was removed from the oil bath and the outside was wiped clean. The mixture was then allowed to cool in the test tube, wherein the mixture was carefully stirred using a thermometer having a red liquid ball on the end with a diameter of 3 mm. The red liquid ball on the end was in contact with the bottom of the test tube while stirring. The stirring was briefly interrupted at regular intervals, the red liquid ball was pressed against the test tube wall in the cylindrical region of the test tube, the visibility of the red liquid ball through the mixture along the diameter of the test tube was checked, and the temperature of the mixture was read off. The cloud point is then the temperature at which the red liquid ball can no longer be seen through the mixture along the diameter of the test tube.

To determine the cloud point more precisely, the temperature range in which the cloud point occurs was determined in a first run. The cloud point was then determined as the mean value of three measurements.

Highly compatible resins have a cloud point of up to 65° C. Compatible resins have a cloud point of 66° C. to 100° C. Less compatible resins have a cloud point of 101° C. to 150° C. Poorly compatible resins have a cloud point of 150° C. to 200° C. Incompatible resins have a cloud point of over 200° C. Resins having a cloud point of 30° C. or less are very compatible.

A base polymer that is typically used in hot-melt adhesives was used as the base polymer for the mixture for determining the cloud point. Thus, a metallocene polyolefin typically used in hot-melt adhesives, or an ethylene-vinyl acetate copolymer typically used in hot-melt adhesives, or an amorphous polyalphaolefin typically used in hot-melt adhesives, was used.

Metallocene polyolefins typically used are, for example, Affinity GA 1900 and Affinity GA 1950 from Dow Chemical Company. Typically used ethylene-vinyl acetate copolymers are, for example, Evatane 18-500, Evatane 28-420, and Evatane 33-400 from Arkema. In the aforementioned Evatane ethylene-vinyl acetate copolymers, the first two digits describe the mean value of the vinyl acetate content in weight percent, and the last three digits describe the mean value of the melt flow index at 190° C. and 2.16 kg according to ISO 1133 or ASTM D1238. Amorphous polyalphaolefins that are typically used are, for example, Vestoplast 608, Vestoplast 703, and Vestoplast 750 from Evonik Industries. The resins are used with their respective current properties. If one of the resins is no longer available, it is replaced by a different resin (respectively corresponding mPO, EVAC, APAO) which is typically used in hot-melt adhesives instead.

TABLE 2

Properties of the hydrogenated hydrocarbon resins

| No. | Yellow | Mn | Mw | Mz | PDI | EP |
|---|---|---|---|---|---|---|
| 1-H | 1.6 | 408 | 777 | 1558 | 1.91 | 97.1 |
| 2-H | 0.4 | 252 | 533 | 1285 | 2.11 | 92.7 |
| 3-H | 0.6 | 258 | 540 | 1253 | 2.09 | 94.6 |
| 4-H | 1 | 361 | 680 | 1350 | 1.88 | 106 |
| 5-H* | 1.2 | 346 | 814 | 2086 | 2.35 | 111.5 |
| 6-H** | 1.2 | 380 | 773 | 1615 | 2.04 | 102.7 |

Explanations for Table 2:

Yellow - Yellowness Index, measured in accordance with the ASTM D1209-05(2011) standard;

Mn - number-average molecular weight in g/mol;

Mw - weight-average molecular weight in g/mol;

Mz - centrifuge-average molecular weight in g/mol;

PDI - polydispersity index;

EP - softening point according to ASTM D3461 in ° C.;

*and **hydrogenated resins of the comparative examples, see also Explanations for Table 1.

TABLE 3

| | Compatibility | | | | | | |
|---|---|---|---|---|---|---|---|
| | Cloud point [° C.] | | | | | | |
| No. | Affinity GA 1900/ 1950 | Vesto-plast 703 | Vesto-plast 750 | Vesto-plast 608 | Evatane 18-500 | Evatane 28-420 | Evatane 33-400 |
| 1-H | 30 | 30 | 30 | 30 | 30 | 137 | 205 |
| 2-H | 30 | 30 | 30 | 30 | 56 | 55 | 133 |
| 3-H | 30 | 30 | 30 | 30 | 30 | 60 | 140 |
| 4-H | 30 | 30 | 30 | 30 | 62 | 144 | 205 |
| 5-H* | 30 | 170 | 210 | 215 | 144 | 250 | 250 |
| 6-H** | 30 | 30 | 30 | 70 | 88 | 181 | 225 |

Explanations for Table 3:
The indicated cloud points were determined as described above;
*and **hydrogenated resins of the comparative examples, see also Explanations for Table 1.

As follows from the preceding data, it is possible to obtain hydrocarbon resins with a PDI of 2.27 and Gardner color numbers of 14.1 or less by the thermal polymerization of cyclic diolefin compounds and an aromatic component containing indene or $C_{1-4}$-alkylindene in the method according to the invention. It was thereby even possible to obtain hydrocarbon resins with a PDI of 1.91 and a Gardner color number of 11.1. The fully hydrogenated hydrocarbon resins are well compatible with metallocene polyolefins and amorphous polyalphaolefins typically used in hot-melt adhesives. In particular, the fully hydrogenated hydrocarbon resins according to the invention even exhibit good compatibilities with ethylene-vinyl acetate copolymers typically used in hot-melt adhesives.

LIST OF REFERENCE SIGNS

11 BN-200 supply tank
12 C9 fraction supply tank
13 Pure dicyclopentadiene supply tank
14 Xylene supply tank
15 Receiver
16 Heater
20 Tubular reactor
21 Flash evaporator
22 Intermediate storage tank
22' Removal
23 Product recycling
24 Partial condenser
24' Oligomer recycling
24" Discharge of solvent and unreacted monomer

The invention claimed is:

1. A hydrocarbon resin obtainable by thermal polymerization of a cyclic diolefin component comprising a cyclic diolefin compound with an aromatic component comprising indene and/or $C_{1-4}$ alkylindene, with the hydrocarbon resin having a polydispersity index (PDI) of 1.5 to 1.95 and comprising repeating units originating from the cyclic diolefin compound and indene and/or $C_{1-4}$-alkylindene units, and optionally comprising further units originating from the aromatic component, wherein the hydrocarbon resin contains 4 to 20 wt. %, based on the total mass of the hydrocarbon resin, indene units and/or $C_{1-4}$-alkylindene units, wherein said hydrocarbon resin is free of hydrogenation, and has a Gardner color number of 12 or less.

2. The hydrocarbon resin according to claim 1, wherein the hydrocarbon resin contains 4 to 16 wt. %, based on the total mass of the hydrocarbon resin, indene units and/or $C_1$-4-alkylindene units.

3. The hydrocarbon resin according to claim 1, wherein the hydrocarbon resin has an Mz of 800 to 2450 g/mol; and/or in that the hydrocarbon resin has a softening point, determined according to the ring and ball method in accordance with the ASTM D3461 standard, of 80° C. to 140° C.

4. The hydrocarbon resin according to claim 1, wherein the cyclic diolefin component contains 30 wt. % or more, based on the total mass of the cyclic diolefin component, of the cyclic diolefin compound.

5. The hydrocarbon resin according to claim 1, wherein the cyclic diolefin compound comprises a conjugated cyclodialkene and/or is selected from the group consisting of cyclopentadiene, and cyclopentadiene derivatives.

6. The hydrocarbon resin according to claim 1, wherein the hydrocarbon resin contains 40 to 85 wt. % of units originating from the cyclic diolefin compound, based on the total mass of the hydrocarbon resin.

7. The hydrocarbon resin according to claim 1, wherein the aromatic component is an aromatic mixture which contains indene and/or $C_{1-4}$-alkylindene and at least one ethylenically unsaturated aromatic compounds respectively having, independently of one another, 8 to 15 carbon atoms.

8. The hydrocarbon resin according to claim 7, wherein the aromatic mixture is a mixture containing 50 wt. % or less vinyl aromatics, 30 wt. % or less indene, and 15 wt. % or less $C_{1-4}$-alkylindene, based on the total mass of the mixture; or is a mixture containing 60 wt. % or less indene and/or $C_{1-4}$-alkylindene, based on the total mass of the mixture.

9. The hydrocarbon resin according to claim 7, wherein the hydrocarbon resin contains 5 to 25 wt. % indene units and/or $C_{1-4}$-alkylindene units and units originating from ethylenically unsaturated aromatic compounds, based on the total mass of the hydrocarbon resin.

10. A method for producing a hydrocarbon resin according to claim 1, in which method a monomer mixture, which contains an aromatic component containing indene and/or $C_{1-4}$-alkylindene and a cyclic diolefin component containing a cyclic diolefin compound, is polymerized by heating to a polymerization temperature of at least 180° C. to obtain a product stream containing hydrocarbon resin, wherein oligomers which contain units originating from the cyclic diolefin compound and/or units originating from the aromatic component are separated from the product stream and returned to the monomer mixture, wherein said hydrocarbon resin has a polydispersity index (PDI) of 1.5 to 1.95, wherein said hydrocarbon resin is free of hydrogenation.

11. The method according to claim 10, wherein the monomer mixture is substantially single-phase liquid while heating up to the polymerization temperature and during the polymerization, and/or in that the polymerization temperature is 200° C. to 300° C.; and/or in that the polymerization is performed at a pressure of 10 bar to 25 bar; and/or in that the polymerization is performed continuously in a tubular reactor.

12. The method according to claim 10, wherein the monomer mixture contains 50 to 95 wt. % of the cyclic diolefin compound, based on the total mass of the cyclic diolefin compound, indene and/or $C_{1-4}$-alkylindene, and ethylenically unsaturated aromatic compounds.

13. The method according to claim 10, wherein the monomer mixture contains 5 to 40 wt. % of indene and/or $C_{1-4}$-alkylindene and ethylenically unsaturated aromatic compounds, based on the total mass of the cyclic diolefin compound, indene and/or $C_{1-4}$-alkylindene, and ethylenically unsaturated aromatic compounds.

14. The method according to claim 10, wherein the monomer mixture comprises a non-polymerizable solvent.

15. The method according to claim 10, wherein the oligomers boil at an absolute pressure of 100 mbar or less, and at a temperature of 80° C. or more, and/or have a molecular weight of 100 to 600 g/mol.

16. The method according to claim 14, wherein the oligomers and the optional non-polymerizable solvent are partially or completely removed from the product stream by batchwise or continuous evaporation after the polymerization, and/or the oligomers are partially or completely separated, batchwise, from the non-polymerizable solvent by complete or partial condensation after the evaporation, and/or are returned, batchwise or continuously, to the monomer mixture for further polymerization after the condensation.

17. The method according to claim 10, wherein the hydrocarbon resin is partially or completely hydrogenated in a subsequent hydrogenation step in order to obtain a hydrogenated hydrocarbon resin.

18. The method according to claim 17, wherein the hydrogenation step is performed in the presence of a solvent, that is liquid at room temperature, and/or in the presence of a catalyst.

19. The method according to claim 17, wherein the hydrogenation step is performed at a pressure of more than 60 bar and/or at a temperature of 240° C. or higher.

20. A composition comprising
a hydrocarbon resin according to claim 1, and
an adhesive polymer.

* * * * *

UNITED STATES PATENT AND TRADEMARK OFFICE
CERTIFICATE OF CORRECTION

PATENT NO. : 11,976,150 B2
APPLICATION NO. : 17/798918
DATED : May 7, 2024
INVENTOR(S) : Manuel Nau et al.

Page 1 of 1

It is certified that error appears in the above-identified patent and that said Letters Patent is hereby corrected as shown below:

In the Claims

Column 26, Line 24, Claim 2, delete "$C_1$-4-alkylindene" and insert -- $C_{1-4}$-alkylindene --

Signed and Sealed this
Twenty-third Day of July, 2024

Katherine Kelly Vidal
*Director of the United States Patent and Trademark Office*